Patented Nov. 23, 1937

2,099,717

UNITED STATES PATENT OFFICE 2,099,717

PROCESS FOR THE PRODUCTION OF WATER-SOLUBLE CONDENSATION PRODUCTS

Richard Alles, Mannheim, Germany, assignor to I. G. Farbenindustrie Aktiengesellschaft, Frankfort-on-the-Main, Germany No Drawing. Application November 5, 1935, Serial No. 48,336. In Germany November 9, 1934

16 Claims. (Cl. 149—5)

The present invention relates to a process for the production of water-soluble condensation products which are suitable as tanning agents.

I have found that water-soluble condensation products which are suitable as tanning agents can be obtained by treating cellulose sulphite waste liquor with phenolic bodies of the benzene series and organic sulphonic acids, preferably while adding low molecular aliphatic compounds containing at least one carbonyl group. Phenolic bodies suitable for the present process are, for example, phenol or derivatives thereof such as cresols, xylenols, resorcin, chlorphenols, dihydroxy diphenyl, dihydroxydiphenylsulphones, di-p-hydroxydiphenylmethane, di - p - hydroxyphenyl-dimethyl-methane and the like. Sulphonic acids which come into question in the present process are particularly aromatic sulphonic acids such as benzene sulphonic acids, phenol- or cresol sulphonic acids, α- or β-naphthalene sulphonic acids, methyl- or butyl naphthalene sulphonic acids, anthracene sulphonic acids and similar products. Instead of the said sulphonic acids also their condensation products with low molecular aldehydes or ketones, for example, formaldehyde, acetaldehyde, acetone and the like, may be employed.

Low molecular aliphatic compounds containing carbonyl groups which are especially suitable for the condensation of the said initial materials are the aliphatic carbonyl compounds containing up to 6 carbon atoms, for example, formaldehyde, acetaldehyde (if desired in the form of paraldehyde), propionaldehyde, acetone, methylethyl ketone, etc. Instead of the said aldehydes or ketones also their derivatives or substitution products particularly their addition compounds with sodium bisulphite can advantageously be employed.

The sequence of the action of the components may be varied in any suitable manner. For example cellulose sulphite waste liquor may be caused to react with organic sulphonic acids for some time at elevated temperature, whereupon the condensation is carried out by adding phenolic bodies and low molecular aldehydes or ketones. It is also possible to treat the phenolic bodies together with cellulose sulphite waste liquor or organic sulphonic acids at elevated temperature for some time before further condensation is effected by adding the other components. Furthermore the phenolic bodies may first be condensed with the low molecular aldehydes or ketones, the products obtained then being condensed with the other components (cellulose sulphite waste liquor and organic sulphonic acids) which latter components may be added in any desired sequence. Valuable products are also obtainable by condensing the cellulose sulphite waste liquor together with the phenolic bodies in the presence of the said aldehydes or ketones and then adding the organic sulphonic acids.

Preferably the condensation is carried out in alkaline media, for example while adding caustic soda solution. The temperatures preferably to be employed are from about 60° to 150° C., generally speaking the condensation is carried out by heating the reaction mixture on the waterbath.

In the manner described condensation products are obtained which are comparatively easily soluble in water and which are most suitable tanning agents. If the condensation is carried out in alkaline media, the reaction mixture possesses alkaline reaction. In this case the reaction mixture is acidified by adding acids, for example formic acid, in order to obtain a product with the desired acidity.

The following examples are intended only to illustrate the present invention, but the invention is not restricted to these examples. The parts are by weight.

Example 1

200 parts of cellulose sulphite waste liquor of about 32° Bé. strength are mixed together with 20 parts of phenol, a solution of 30 parts of β-naphthalene sulphonic acid in 70 parts of water and 75 parts of 30 per cent aqueous formaldehyde solution. Then caustic soda solution of 36° Bé. is added to the said mixture until alkaline reaction is obtained, whereupon the whole mass is heated for about 3 hours at 90° to 100° C. The reaction mixture is diluted by adding water and acidified by the addition of 20 parts of formic acid. The product obtained is a good tanning agent.

Example 2

A condensation product is prepared from dihydroxyphenyl sulphone, formaldehyde-bisulphite and formaldehyde. A solution of 40 parts of this condensation product in 60 parts of water is mixed together with 200 parts of cellulose sulphite waste liquor of about 32° Bé., 10 parts of resorcin and 60 parts of 30 per cent aqueous formaldehyde solution. The mixture is made alkaline by adding caustic soda solution and then heated for from about 2 to 3 hours at a temperature of 90° to 100° C. After diluting the reaction product with water the mixture is acidified by adding 20 parts of formic acid. The jelly-like reaction product is easily soluble in warm water.

Example 3

200 parts of cellulose sulphite waste liquor of about 32° Bé. are mixed together with 20 parts of 4.4'-dihydroxydiphenylsulphone and a solution of 30 parts of the condensation product of β-naphthalene sulphonic acid with formaldehyde in 70 parts of water and 60 parts of 30 per cent aqueous formaldehyde solution. The mixture is made alkaline and worked up as indicated in Example 1.

Example 4

To the mixture of 200 parts of cellulose sulphite waste liquor, 20 parts of 4.4'-dihydroxydiphenylsulphone, a solution of 50 parts of the condensation product of cresol sulphonic acid and formaldehyde in 50 parts of water and 60 parts of 30 per cent soda solution are added to form a mixture having an alkaline reaction. The mixture is then heated for 3 hours on the boiling water-bath. The reaction product is diluted with water and then partially transformed into a resin-like product by addition of 25 per cent formic acid; it is sufficiently soluble in water for the use in tanning processes.

Example 5

200 parts of cellulose sulphite waste liquor are mixed together with 40 parts of di-p-hydroxyphenyldimethylmethane and a solution of 90 parts of the condensation product of β-naphthalene sulphonic acid and formaldehyde in 180 parts of water. The mixture is made alkaline by the addition of caustic soda solution and then heated for about 6 hours at 90° C. The reaction product is diluted with water and acidified by adding hydrochloric acid.

Example 6

200 parts of cellulose sulphite waste liquor of about 32° Bé. are heated together with a solution of 100 parts of the neutralized condensation product of cresol sulphonic acid and formaldehyde in 100 parts of water for about 5 hours at about 100° C. Into the reaction mixture a solution of 40 parts of di-p-hydroxyphenyldimethylmethane in 50 parts of caustic soda solution of 36° Bé. and 60 parts of 30 per cent aqueous formaldehyde solution are introduced, whereupon the mixture is further heated for about 2½ hours. The reaction product obtained is diluted with water and then acidified with 20 parts of 30 per cent glycolic acid. It can directly be employed for tanning hides.

Example 7

A solution of 75 parts of the condensation product of cresol sulphonic acid and formaldehyde in 75 parts of water is heated after addition of 30 parts of di-p-hydroxyphenyl-dimethylmethane, 80 parts of water and 30 parts of caustic soda solution of 36° Bé. for 5 hours on the boiling water-bath. Then 200 parts of neutralized cellulose sulphite waste liquor of about 30° Bé., 20 parts of caustic soda solution of 36° Bé. and 60 parts of 30 per cent formaldehyde are introduced into the reaction mixture, whereupon the mixture is further heated for 2½ hours. The reaction product obtained is diluted with water and acidified with 20 parts of formic acid.

Example 8

200 parts of neutralized cellulose sulphite waste liquor of 32° Bé. are heated together with 40 parts of di-p-hydroxyphenyl-dimethylmethane, 100 parts of water, 30 parts of caustic soda solution of 60° Bé. and 60 parts of 30 per cent aqueous formaldehyde solution for 5 hours at a temperature of about 100° C. A solution of 100 parts of the neutralized condensation product of phenol sulphonic acid and formaldehyde in 100 parts of water and 20 parts of caustic soda solution of 36° Bé. are introduced into the reaction mixture while stirring; then the reaction mixture is heated for ½ hour. The reaction product is acidified by adding 20 parts of formic acid.

Example 9

200 parts of cellulose sulphite waste liquor of 32° Bé. are added to a mixture of 20 parts of di-p-hydroxyphenyl-di-methylmethane and 10 parts of phenol in 80 parts of water and a solution of 50 parts of the condensation product of phenol sulphonic acid and acetone in 50 parts of water. The mixture is made alkaline by the addition of 50 parts of caustic soda solution of 36° Bé. and heated for 3½ hours on the water-bath after addition of 60 parts of 30 per cent formaldehyde. The reaction product obtained is diluted with water and then acidified by addition of the necessary amount of sulphuric acid.

Example 10

A solution of 75 parts of the neutralized condensation product of cresol sulphonic acid and formaldehyde in 75 parts of water is heated on the boiling water-bath after adding 30 parts of di-p-hydroxyphenyl-di-methylmethane and 50 parts of caustic soda solution of 36° Bé. for 3 hours. Then while stirring 200 parts of neutralized cellulose sulphite waste liquor of about 32° Bé. are added to the reaction mixture into which 30 parts of acetaldehyde have been introduced. The reaction mixture is then heated for about 2½ hours on the water-bath. The reaction product obtained is acidified by adding 25 parts of concentrated formic acid. A thinly liquid clear solution is obtained which can be directly employed for tanning.

Example 11

A solution of 75 parts of the neutralized condensation product of cresol sulphonic acid and formaldehyde in 75 parts of water is heated for 3 hours on the boiling water-bath after addition of 30 parts of di-p-hydroxyphenyl-di-methylmethane and 50 parts of caustic soda solution of 36° Bé. Then 200 parts of cellulose sulphite waste liquor of about 32 Bé. and 35 parts of acetone are added while stirring to the reaction mixture which is then further heated for about 2 hours. The reaction product obtained is diluted with water and acidified by adding 25 parts of concentrated formic acid. The acidified product is of a pulp-like condition and may be advantageously employed for tanning.

What I claim is:—
1. The process for the production of water-soluble condensation products suitable as tanning agents which comprises treating cellulose sulphite waste liquor with a phenolic body of the benzene series, an organic sulphonic acid and a low molecular aliphatic compound containing at least one carbonyl group.

2. The process for the production of water-soluble condensation products suitable as tanning agents which comprises heating cellulose sulphite waste liquor with a dihydroxydiphenyl compound, an organic sulphonic acid and a low molecular aliphatic compound containing at least one carbonyl group.

3. The process for the production of water-soluble condensation products suitable as tanning agents which comprises heating cellulose sulphite waste liquor with a dihydroxy-diphenyl compound, an organic sulphonic acid and formaldehyde.

4. The process for the production of water-soluble condensation products suitable as tanning agents which comprises heating cellulose sulphite waste liquor with a phenolic body of the benzene series, an aromatic sulphonic acid and formaldehyde.

5. The process for the production of water-soluble condensation products suitable as tanning agents which comprises heating cellulose sulphite waste liquor with a phenolic body of the benzene series, a cresol sulphonic acid and formaldehyde.

6. The process for the production of water-soluble condensation products suitable as tanning agents which comprises heating cellulose sulphite waste liquor with a phenolic body of the benzene series, a condensation product of an aromatic sulphonic acid with a low molecular aliphatic compound containing at least one carbonyl group, and formaldehyde.

7. The process for the production of water-soluble condensation products suitable as tanning agents which comprises heating cellulose sulphite waste liquor with a phenolic body of the benzene series, an aromatic sulphonic acid and acetone.

8. The process for the production of water-soluble condensation products suitable as tanning agents which comprises heating cellulose sulphite waste liquor in alkaline media at a temperature from about 60° to 150° C. with a phenolic body of the benzene series, an aromatic sulphonic acid and formaldehyde.

9. Water-soluble condensation products suitable as tanning agents derived from cellulose sulphite waste liquor, a phenolic body of the benzene series, an organic sulphonic acid and a low molecular compound containing at least one carbonyl group.

10. Water-soluble condensation products suitable as tanning agents derived from cellulose sulphite waste liquor, a dihydroxy-diphenylsulphone, an aromatic sulphonic acid and a low molecular compound containing at least one carbonyl group.

11. Water-soluble condensation products suitable as tanning agents derived from cellulose sulphite waste liquor, a dihydroxydiphenyl compound and an aromatic sulphonic acid.

12. Water-soluble condensation products suitable as tanning agents derived from cellulose sulphite waste liquor, a phenolic body of the benzene series, an aromatic sulphonic acid and formaldehyde.

13. Water-soluble condensation products suitable as tanning agents derived from cellulose sulphite waste liquor, a phenolic body of the benzene series, cresol sulphonic acid and formaldehyde.

14. Water-soluble condensation products suitable as tanning agents derived from cellulose sulphite waste liquor, a phenolic body of the benzene series, a condensation product of an aromatic sulphonic acid with a low molecular aliphatic compound containing at least one carbonyl group, and formaldehyde.

15. Water-soluble condensation products suitable as tanning agents derived from cellulose sulphite waste liquor, a phenolic body of the benzene series, an aromatic sulphonic acid and acetone.

16. Water-soluble condensation products suitable as tanning agents derived from cellulose sulphite waste liquor, a phenolic body of the benzene series, an organic sulphonic acid and formaldehyde obtainable by heating the said substances in alkaline media.

RICHARD ALLES.